(12) United States Patent
Lemon et al.

(10) Patent No.: US 11,971,026 B2
(45) Date of Patent: Apr. 30, 2024

(54) AIR COMPRESSOR WITH RAMPED HEAD DECK

(71) Applicant: ZF CV Systems Europe BV, Brussels (BE)

(72) Inventors: Chad Lemon, Charleston, SC (US);
Ramesh Pai, Charleston, SC (US);
Alan Williams, Charleston, SC (US)

(73) Assignee: ZF CV SYSTEMS EUROPE BV, Brussels (BE)

( * ) Notice: Subject to any disclaimer, the term of this patent is extended or adjusted under 35 U.S.C. 154(b) by 224 days.

(21) Appl. No.: 17/400,479

(22) Filed: Aug. 12, 2021

(65) Prior Publication Data

US 2023/0048353 A1 Feb. 16, 2023

(51) Int. Cl.
| | |
|---|---|
| *F04B 39/12* | (2006.01) |
| *B60T 13/26* | (2006.01) |
| *F04B 39/00* | (2006.01) |
| *F04B 39/10* | (2006.01) |
| *F04B 53/00* | (2006.01) |
| *F04B 53/10* | (2006.01) |

(52) U.S. Cl.
CPC ............ *F04B 39/122* (2013.01); *B60T 13/26* (2013.01); *F04B 39/108* (2013.01); *F04B 39/0094* (2013.01); *F04B 39/1086* (2013.01); *F04B 39/125* (2013.01); *F04B 53/007* (2013.01); *F04B 53/1085* (2013.01)

(58) Field of Classification Search
CPC ................ F04B 39/122; F04B 39/0094; F04B 39/1073; F04B 39/108; F04B 39/1086; F04B 39/125; F04B 53/007; F04B 53/1085; B60T 13/26
See application file for complete search history.

(56) References Cited

U.S. PATENT DOCUMENTS

| | | | | |
|---|---|---|---|---|
| 3,384,298 | A * | 5/1968 | Rontgen | F04B 39/1086 137/512 |
| 3,994,319 | A * | 11/1976 | Airhart | F04B 39/1073 273/DIG. 23 |
| 2004/0163713 | A1* | 8/2004 | Schulze | F16K 15/16 137/512 |
| 2012/0036993 | A1* | 2/2012 | Nieter | F16K 15/031 91/468 |
| 2018/0238312 | A1* | 8/2018 | Flanigan | F04B 39/0005 |

* cited by examiner

*Primary Examiner* — Kenneth J Hansen
*Assistant Examiner* — David N Brandt
(74) *Attorney, Agent, or Firm* — Warner Norcross + Judd LLP

(57) ABSTRACT

An improved air compressor is provided. The air compressor includes a cylinder block having a head deck that defines a piston bore for reciprocal movement of a piston therein. The head deck further includes first and second ramped surfaces that slope downward toward the peripheral edge of the piston bore. A valve plate is in direct contact with the upper surface of the head deck, the valve plate having a leaf valve. During an intake stroke of the piston, the leaf valve deflects downward into direct engagement with the first and second ramped surfaces. Because the air compressor lacks a lower gasket between the valve plate and the head deck, the cost and assembly time associated with the lower gasket are eliminated.

15 Claims, 6 Drawing Sheets

AIR COMPRESSOR WITH RAMPED HEAD DECK

FIELD OF THE INVENTION

The present invention relates to piston air compressors, and in particular, naturally aspirated and turbo charged piston air compressors for vehicle air brake systems.

BACKGROUND OF THE INVENTION

In commercial vehicles, piston air compressors provide a steady supply of compressed air for vehicle braking systems. Piston air compressors for this purpose include a crankcase, a cylinder block, and a cylinder head. The crankcase contains a crankshaft, and the cylinder block contains a piston that is connected to the crankshaft via a connection rod. A lower gasket is positioned immediately above the cylinder block, with the lower gasket being designed to provide an air-tight seal between the cylinder block and the cylinder head.

During operation, the crankshaft is driven by the vehicle's engine and functions continuously while the engine is running. As the piston begins the down stroke from top dead center, a vacuum created above the piston opens an inlet valve in the cylinder head. Atmospheric or pressurized air flows through the open inlet valve and fills the piston chamber. At bottom dead center, the inlet valve closes. As the piston moves upward from bottom dead center, air above the piston is compressed. When this air reaches a pressure greater than a system pressure, the cylinder head allows compressed air to flow into a supply reservoir via an air dryer.

As noted above, existing air compressors require a lower gasket between the cylinder block and the cylinder head. However, the lower gasket adds cost and complexity, and it is therefore desirable to achieve an improve piston air compressor that no longer requires a lower gasket, including naturally aspirated and turbo charged air compressors.

SUMMARY OF THE INVENTION

An improved air compressor is provided. The air compressor includes a cylinder block having a head deck that defines a piston bore for reciprocal movement of a piston therein. The head deck further includes first and second ramped surfaces that slope downward toward the peripheral edge of the piston bore. A valve plate is in direct contact with the upper surface of the head deck, the valve plate having a leaf valve. During an intake stroke of the piston, the leaf valve deflects downward into direct engagement with the first and second ramped surfaces. Because the air compressor lacks a lower gasket between the valve plate and the head deck, the cost and assembly time associated with the lower gasket are eliminated.

In some embodiments, the first and second ramped surfaces are on opposing sides of the piston bore and slope downward at an angle of between 2° and 10° relative to the upper surface of the head deck. The ramped surfaces can provide the same lift, contact point, and contact angle as current production designs, but without a lower gasket. The head deck further optionally includes a side recess intersecting the peripheral edge of the piston bore for a sliding valve pin clearance. Opposite of the side recess, the head deck includes a pin opening for a sliding valve pivot pin. The valve plate optionally includes an upper coating on an upper surface thereof and a lower coating on a lower surface thereof for providing a seal between the cylinder block and a cylinder head. These and other embodiments are well suited for naturally aspirated and turbo charged air compressors for commercial vehicles and other applications.

These and other features and advantages of the present disclosure will become apparent from the following description of particular embodiments, when viewed in accordance with the accompanying drawings and appended claims.

DETAILED DESCRIPTION OF THE CURRENT EMBODIMENT

The current embodiment generally includes a piston-type air compressor having a head deck with first and second ramped surfaces that slope downward toward a piston bore. The ramped surfaces eliminate the need for a lower gasket between a valve plate and a cylinder block, such that the valve plate is in direct physical contact with the cylinder block.

Figure 1:
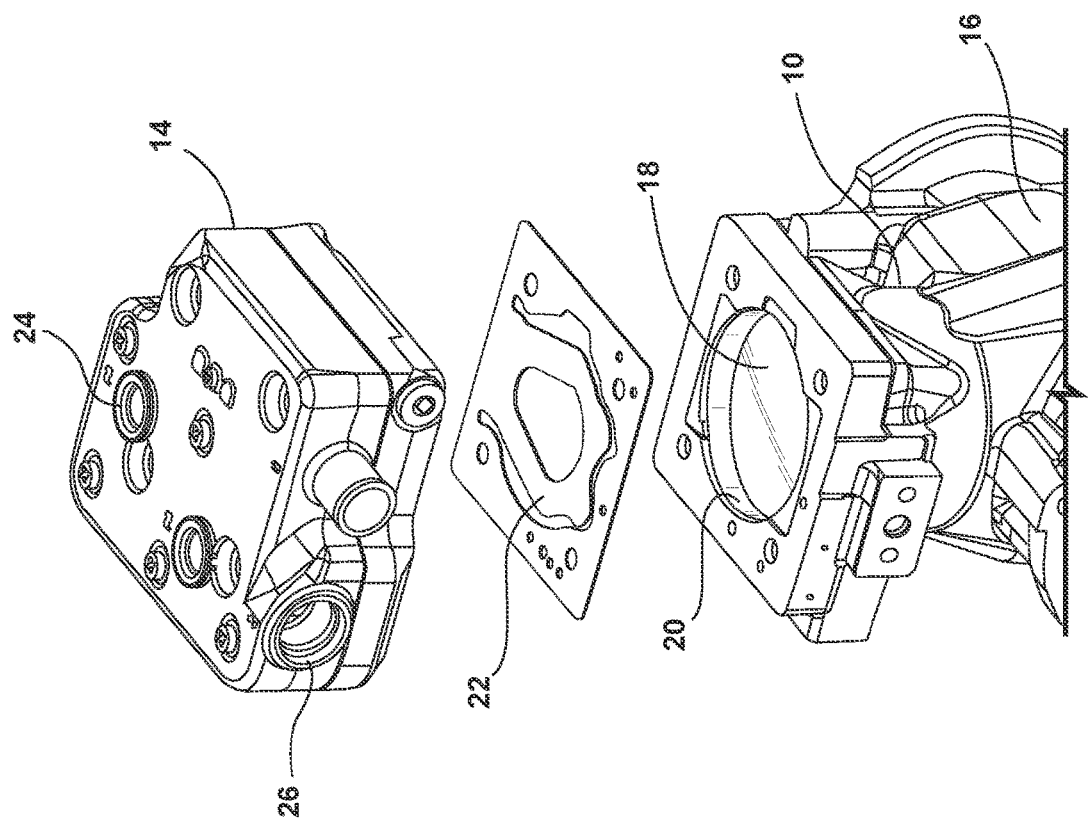
FIG. 1 is an exploded view of an air compressor including a crankcase, a cylinder block, a valve plate, and a cylinder head.

More specifically, and referring to FIG. 1, an air compressor includes a cylinder block 10, a valve plate 12, and a cylinder head 14. The cylinder block 10 is integrally joined to a crankcase 16, which houses a crankshaft. The cylinder block 10 houses a piston 18 with a piston bore 20. The valve plate 12 is formed from a unitary material, for example spring steel, and includes a flexible leaf valve 22 (or reed valve) for allowing air into the piston bore 20 during a down stroke of the piston 18. When assembled, the valve plate 12 is sandwiched between the cylinder block 10 and the cylinder head 14. The cylinder head 14 includes an inlet port 24 and a discharge port 26, as well as an internal suction chamber and an internal discharge chamber. Additional cylinder head ports can include water ports for cooling and oil ports for lubrication. The particular construction of the air compressor can vary from application to application, and is depicted here as a single-cylinder reciprocating air compressor merely for illustrative purposes.

Figure 2:
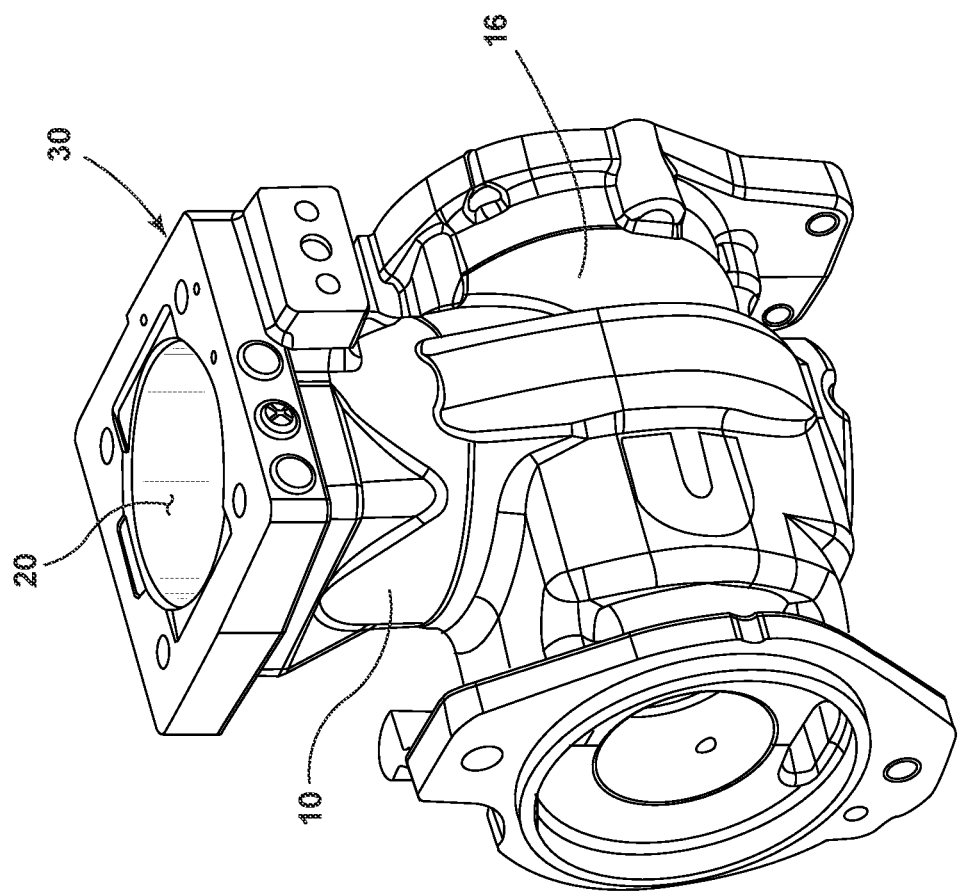
FIG. 2 is a perspective view of the crankcase and cylinder block of FIG. 1.
Figure 3:
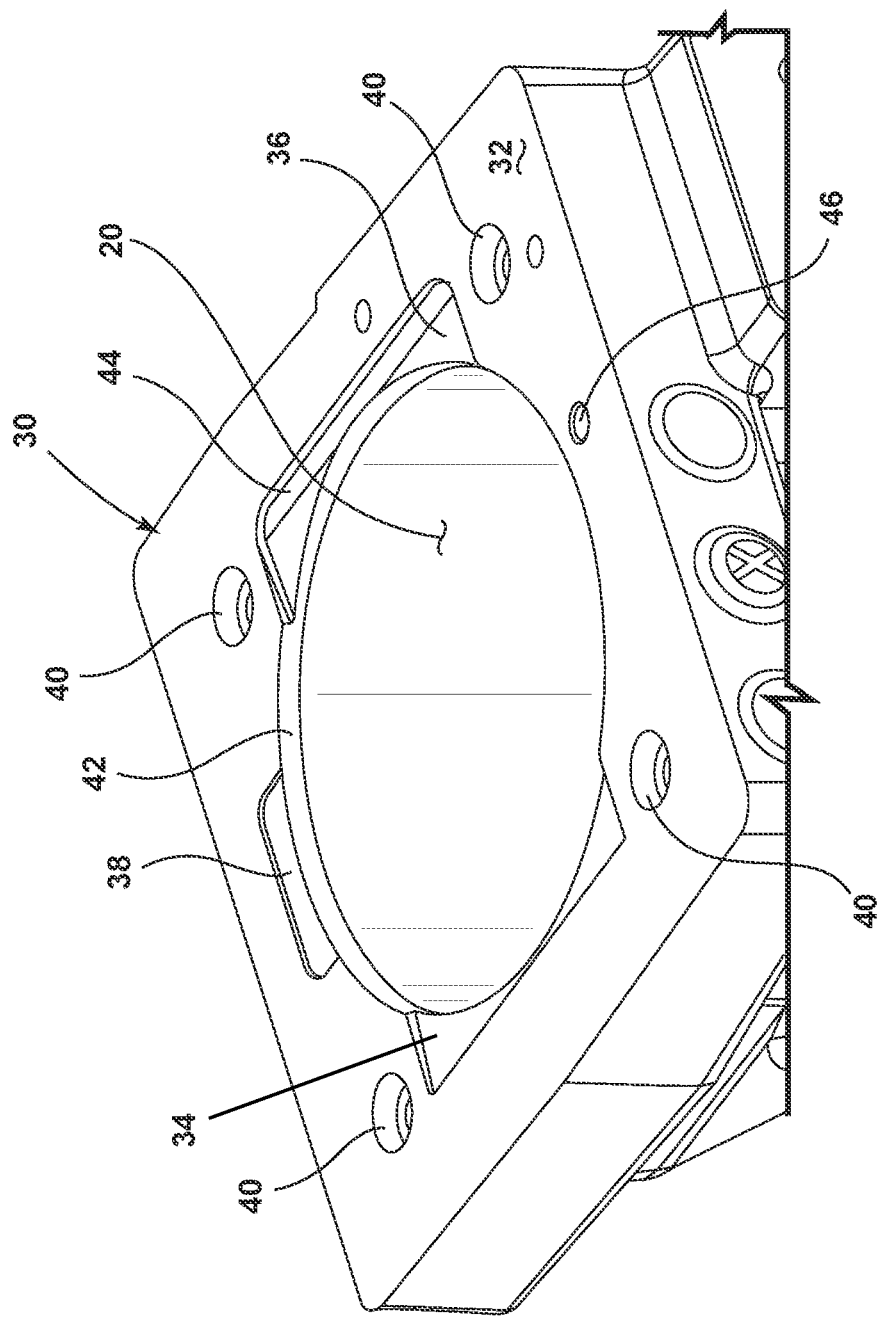
FIG. 3 is an enlarged perspective view of the cylinder block of FIG. 1.
Figure 4:
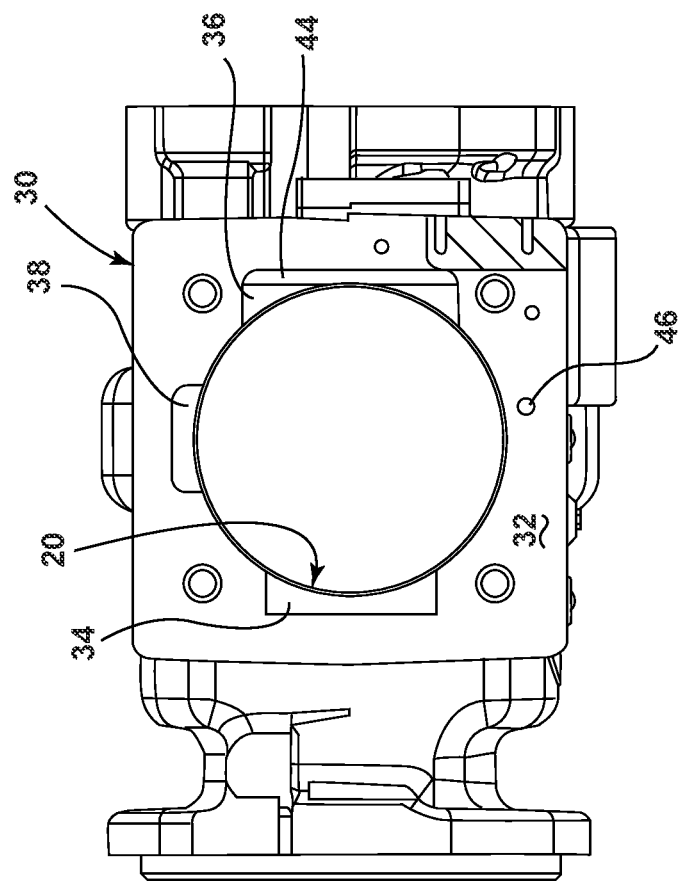
FIG. 4 is a top plan view of the cylinder block of FIG. 1.

As shown in FIGS. 2 and 3, the cylinder block 10 includes a head deck 30. The head deck 30 includes an upper surface 32, a first ramped surface 34, a second ramped surface 36, and a side recess 38. The upper surface 32 is generally planar and includes multiple threaded openings 40 for securing the cylinder head 14 to the cylinder block 10. The first and second ramped surfaces 34, 36 are positioned opposite each other, sloping downward toward the peripheral edge 42 of the piston bore 20. The first ramped surface 34 transitions from the upper surface 32 of the head deck 30 to the peripheral edge 42 of the piston bore 20. The second ramped surface 36 transitions from an elongated step 44 to the peripheral edge 42. The elongated step 44 is recessed relative to the upper surface 32 of the head deck 30. The side recess 38 intersects the peripheral edge 42 of the piston bore 20 for a sliding valve pin clearance.

Figure 5:
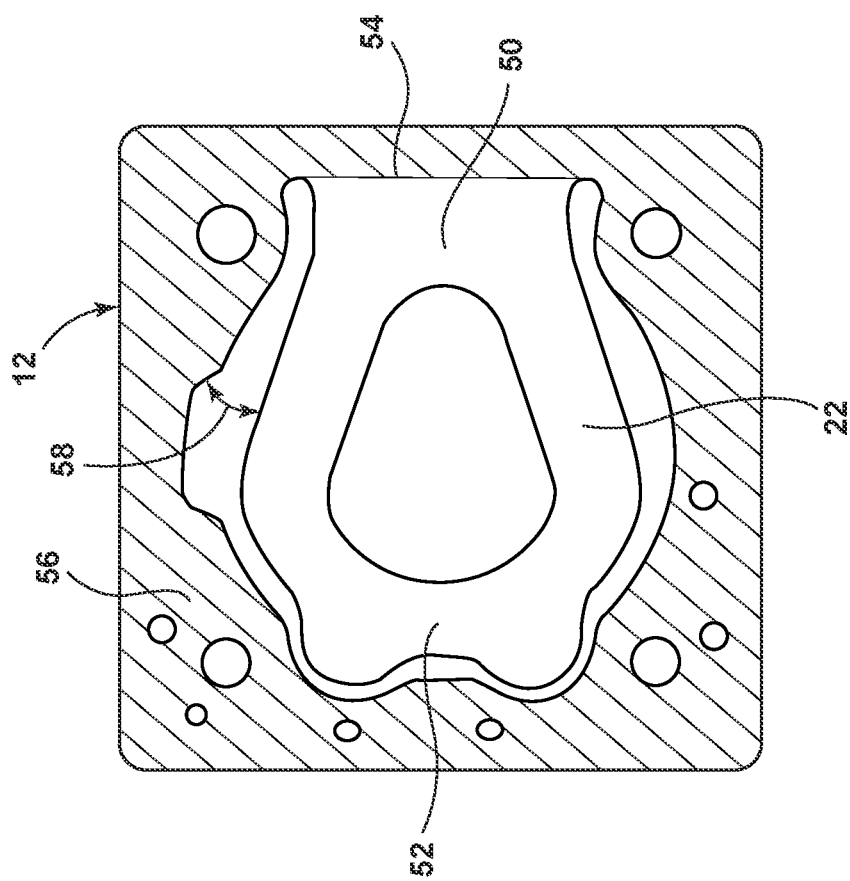
FIG. 5 is a top plan view of the valve plate and leaf valve illustrated in FIG. 1.

More specifically, the first and second ramped surfaces 34, 44 are inclined relative to the planar upper surface 32 by the same angle, for example, an angle of between −2° and −10°. Further optionally, the first and second ramped surfaces 34, 44 are inclined relative to the planar upper surface 32 by an angle of −5°. In addition, each of the first and second ramped surfaces 34, 34 intersect at least 10% of the circumference of the peripheral edge of the piston bore (i.e., a span of at least 36°), being directly opposite each other. In this configuration, the leaf valve 22 (shown in FIG. 5) can deflect downward during an intake stroke of the piston 18 due to the vacuum created in the piston chamber. The leaf valve 22 includes a first portion 50 and a second portion 52 that are spaced apart from each other. The first portion 50 is proximal to a living hinge 54, and the second portion 52 is distal from the living hinge 54. Except for the living hinge 54, the leaf valve 22 is separated from a border portion 56 of the valve plate 12 by a gap 58, such that the leaf valve 22 is free to flex downwardly in a manner known in the art. The valve plate 12 includes an upper coating on an upper surface thereof and a lower coating on a lower surface thereof, the upper and lower coatings optionally comprising a thermoplastic resin.

Figure 6:
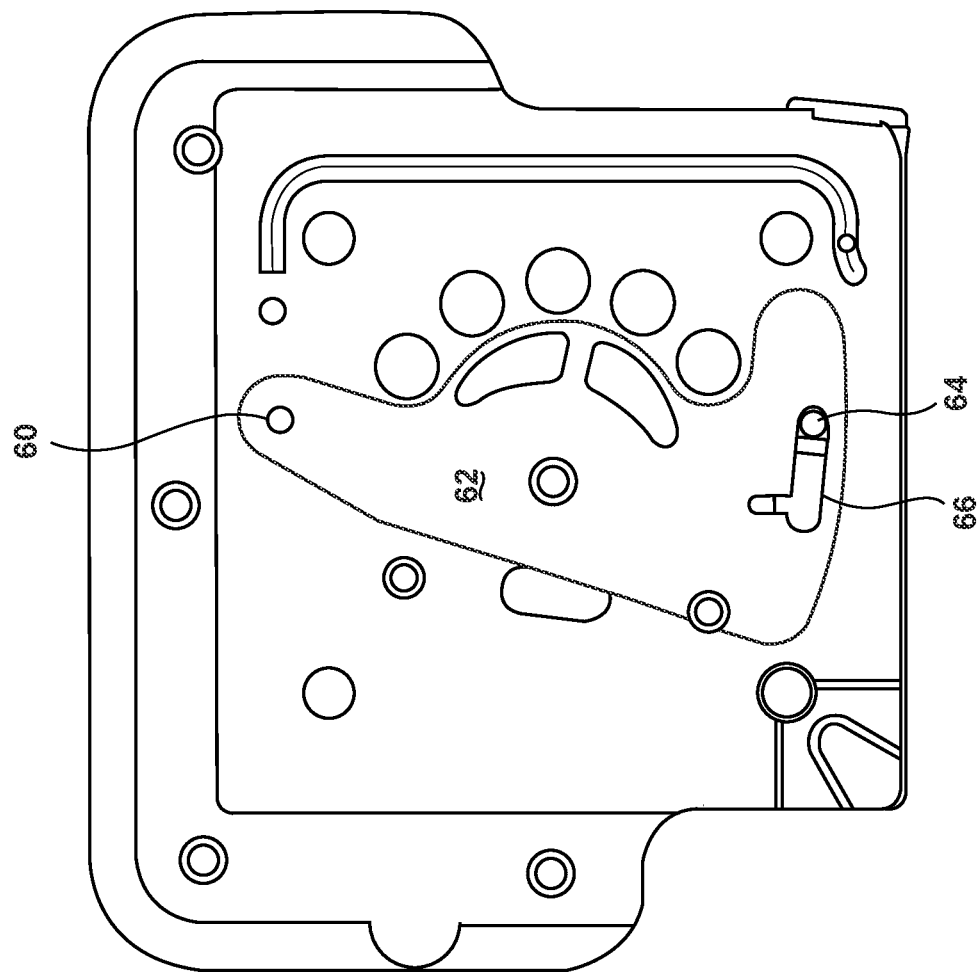
FIG. 6 is a top plan view of a sliding valve within the cylinder head of FIG. 1.

As noted above, the head deck 30 includes a side recess 38 for a sliding valve pin clearance. The side recess 38 intersects the peripheral edge 42 of the piston bore 20. The side recess 38 is a machined (milled) recess in the illustrated embodiment, but can be cast in other embodiments. Opposite of the side recess 38, the head deck 30 includes a pin opening 46 for a pivot pin 60 for a sliding valve 62 (sometimes referred to as a hinged leaf valve). The sliding valve 62 includes an elongated, plate-like body, being shown in FIG. 6. The sliding valve 62 is rotatably anchored at a first end by the pivot pin 60 and is guided at a second end by guide pin 64. The sliding valve 62 is rotatable about the pivot pin 60 by actuation of an unloader valve. The embodiment described above provides a head deck that eliminates the need to have a lower gasket on an air compressor. This construction instead adds machining features to the head deck to simulate a lower gasket and provides the proper lift and intake valve contact points. This construction greatly simplifies compressor assembly for boosted and naturally aspirated compressors and reduces costs by no longer requiring a lower gasket.

The above description is that of current embodiments. Various alterations can be made without departing from the spirit and broader aspects of the invention as defined in the claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. An air compressor comprising:
   a cylinder block including a head deck, the head deck including an upper surface surrounding a piston bore for reciprocal movement of a piston therein; and
   a valve plate including a leaf valve and a border portion, the leaf valve including a first portion that is joined to the border portion along a living hinge and including a second portion that is spaced apart from the border portion by a gap, such that the leaf valve and the border portion are integrally joined to each other along the living hinge, the valve plate being between the cylinder block and a cylinder head and in direct contact with the upper surface of the head deck,
   the head deck further including first and second ramped surfaces on opposing sides of the piston bore, the first and second ramped surfaces sloping downward toward a peripheral edge of the piston bore, wherein the second ramped surface transitions from an elongated step to the peripheral edge, the elongated step being recessed relative to the upper surface of the head deck, the elongated step underlying the living hinge such that the leaf valve is able to flex about the living hinge and deflect downward into engagement with the first and second ramped surfaces to allow air into the piston bore, the head deck further including a side recess intersecting the peripheral edge of the piston bore for a sliding valve pin clearance.

2. The air compressor of claim 1, wherein the valve plate includes an upper coating on an upper surface thereof and a lower coating on a lower surface thereof.

3. The air compressor of claim 1, wherein the first ramped surface transitions from the upper surface of the head deck to the peripheral edge of the piston bore.

4. The air compressor of claim 1, wherein the side recess is offset from and parallel to the upper surface of the head deck.

5. The air compressor of claim 1, wherein the upper surface of the head deck further defines a plurality of threaded openings for securing the cylinder head to the cylinder block.

6. The air compressor of claim 1, wherein the first and second ramped surfaces are inclined relative to the upper surface by an angle of between −2° and −10°.

7. The air compressor of claim 1, wherein the peripheral edge of the piston bore defines a circumference, and wherein each of the first and second ramped surfaces intersect at least 10% of the circumference of the peripheral edge of the piston bore.

8. The air compressor of claim 1, wherein the upper surface of the head deck includes a pin opening for receipt of a pivot pin therein.

9. An air compressor comprising:
   a cylinder head including an inlet port and a discharge port;
   a cylinder block including a head deck having an upper surface surrounding a piston bore for reciprocal movement of a piston therein, the cylinder block further including first and second ramped surfaces that slope downward toward a peripheral edge of the piston bore, wherein the second ramped surface transitions from an elongated step to the peripheral edge of the piston bore, the elongated step being recessed relative to the upper surface of the head deck, the head deck further including a side recess intersecting the peripheral edge of the piston bore; and
   a valve plate including an intake leaf valve and a border portion, the leaf valve including a first portion that is joined to a border portion along a living hinge and including a second portion that is spaced apart from the border portion by a gap, such that the leaf valve and the border portion are integrally joined to each other along the living hinge, the valve plate being between the cylinder head and the cylinder block and in direct contact with the upper surface of the cylinder block, wherein the elongated step underlies the living hinge such that the leaf valve is able to flex about the living hinge, during an intake stroke of the piston and deflect downward into engagement with the first and second ramped surfaces to allow air into the piston bore.

10. The air compressor of claim 9, wherein the valve plate includes an upper coating on an upper surface thereof and a lower coating on a lower surface thereof.

11. The air compressor of claim 9, wherein the elongated step is recessed relative to the upper surface of the cylinder block.

12. The air compressor of claim 9, wherein the first and second ramped surfaces are inclined relative to the upper surface by an angle of between −2° and −10°.

13. The air compressor of claim 9, wherein the peripheral edge of the piston bore defines a circumference, and wherein each of the first and second ramped surfaces intersect at least 10% of the circumference of the peripheral edge of the piston bore.

14. The air compressor of claim 9, wherein the upper surface of the cylinder block includes a pin opening for receipt of a pivot pin therein.

15. The air compressor of claim 9, wherein the upper surface of the cylinder block further defines a plurality of threaded openings for securing the cylinder head to the cylinder block.

\* \* \* \* \*